United States Patent [19]
Heitmann

[11] Patent Number: 5,609,666
[45] Date of Patent: Mar. 11, 1997

[54] PROCESS OF PRODUCING PREFORMS FOR SILICA GLASS OPTICAL WAVEGUIDES WHILE FLOWING GAS THROUGH A TUBULAR SUBSTRATE

[75] Inventor: Walter Heitmann, Gross-Bieberau, Germany

[73] Assignee: Heraeus Quarzglas GmbH, Bundesrepublik, Germany

[21] Appl. No.: 387,729

[22] PCT Filed: Oct. 22, 1993

[86] PCT No.: PCT/EP93/02919

§ 371 Date: Feb. 16, 1995

§ 102(e) Date: Feb. 16, 1995

[87] PCT Pub. No.: WO94/10097

PCT Pub. Date: May 11, 1994

[30] Foreign Application Priority Data

Oct. 29, 1992 [DE] Germany .................... 42 36 578.3

[51] Int. Cl.⁶ .............................................. C03B 37/018
[52] U.S. Cl. ................... 65/421; 65/422; 65/426; 65/424; 65/374.13
[58] Field of Search ................ 65/421, 422, 424, 65/426, 374.13

[56] References Cited

U.S. PATENT DOCUMENTS

| | | |
|---|---|---|
| 4,165,223 | 8/1979 | Powers . |
| 4,286,978 | 9/1981 | Bailey et al. . |
| 4,402,740 | 4/1983 | Edahiro et al. . |
| 4,734,117 | 3/1988 | Pilon et al. . |
| 4,772,302 | 9/1988 | Abe ........................................ 65/426 |

FOREIGN PATENT DOCUMENTS

| | | |
|---|---|---|
| 0163752 | 12/1985 | European Pat. Off. . |
| 61-26504 | 6/1986 | Japan .................... 65/424 |

Primary Examiner—John Hoffmann
Attorney, Agent, or Firm—Felfe & Lynch

[57] ABSTRACT

During the gradual build-up of porous quartz glass by the combustion of a hydrolysis gas mixture and preferably for a certain period of time thereafter, a drying gas mixture is conducted under positive pressure through the porous tubular deposit from the inside to the outside as it is being built-up. This is accomplished by depositing the quartz on a tubular substrate in which a drying gas is introduced at positive pressure.

7 Claims, 2 Drawing Sheets

5,609,666

PROCESS OF PRODUCING PREFORMS FOR SILICA GLASS OPTICAL WAVEGUIDES WHILE FLOWING GAS THROUGH A TUBULAR SUBSTRATE

BACKGROUND OF THE INVENTION

The invention pertains to a process for the production of preforms for quartz glass optical waveguides, which is applicable to the production of optical transmission devices for communications technology. More particularly, the invention relates a method for purging a porous quartz glass tube formed in a hydrolysis process.

In optical communications technology, widespread use is made of optical waveguides based on quartz glass. These waveguides are drawn from quartz glass rods with a length of 1 m to 2 m and with a diameter between 2 cm and 10 cm, which are referred to as "preforms". One of the essential requirements of the preform material is that it must be of extremely high purity, because a concentration of impurities even in the ppb range ($10^{-9}$) can cause severe absorption losses in the waveguide.

Several processes are known for the production of waveguides. These are described, for example, in the book "Optische Telekommunikationssysteme". The four most important processes in order of their economic importance are:

OVD (outside vapor deposition),
MCVD (modified chemical vapor deposition),
VAD (vapor axial deposition), and
PCVD (plasma-activated chemical vapor deposition).

In the MCVD and PCVD processes, a substrate tube of quartz glass is required, in which the waveguide material is then deposited. Although the same purity requirements are not imposed on the material of the substrate tube, it is nevertheless necessary to ensure very low OH concentrations, which means that the process used to produce the substrate tubes is correspondingly expensive. The same is true for the so-called "casing" tubes.

Because most of the light-related performance is concentrated in the core of the waveguide and in a thin, adjacent jacket zone, for economic reasons it is becoming increasingly common to produce only this interior region of highly pure waveguide material and to fuse a thick-walled tube (casing tube) over it, which consists of quartz glass with a somewhat higher concentration of impurities. Nevertheless, the OH content of a casing tube of this type must still be very low.

The OVD process (Corning/USA) is the most economically important process for the production of preforms and is used to produce most preform material. The process is characterized by the simplicity of the production process and by the possibility of producing very large preforms.

The process steps for the production of preforms by the OVD process are shown schematically in FIGS. 1 and 2. As FIG. 1 shows, first a large quartz glass body 1 of fine-pored material is built up in stages. For this purpose, a burner 2, which is operated with a mixture of methane ($CH_4$) and oxygen to which silicon tetrachloride ($SiCl_4$) is also added, is moved back forth along a rotating ceramic rod 3 ($Al_2O_3$).

A chemical reaction in the flame, which is referred to as hydrolysis, leads to the formation of quartz glass. This glass is deposited in the form of layers of a white, porous material. This material, also called "glass soot" has under the control of the hydrolysis reaction, a density ranging from 10% to as much as 25% of solid quartz glass and consists of tiny particles of small diameter, which are fused to each other at individual points.

To produce doped quartz glass, germanium tetrachloride ($GeCl_4$), for example, is added to the burner gases. As a result, a $GeO_2$-doped material with an increased index of refraction is produced.

During hydrolysis, both quartz glass and a large amount of water vapor are produced. High concentrations (about 1,000 ppm) of this water vapor are incorporated in the form of OH ions into the porous quartz glass.

After the desired amount of quartz glass has been deposited, the burner is turned off. Because of its higher coefficient of expansion, the substrate rod contracts during cooling to a greater extent than the quartz glass body, with the result that the rod can be pulled out from the quartz. Because of the high OH content of the material produced in this way is, it is still unsuitable for the production of waveguides and must be dried over the course of further process steps.

As illustrated in FIG. 2, porous quartz glass body 1 is placed in a furnace 5. In a first step, i.e., physical drying, the OH content in the quartz glass is reduced from about 1,000 ppm to about 10 ppm over the course of about 2 hours by purging it at 800° C. with dry, ultrapure gases 6 (nitrogen, oxygen, helium).

In the second step, i.e., chemical drying, purging is carried out with chlorine or thionyl chloride gas ($SOCl_2$) and helium. This chemically active gas mixture flows around the porous quartz glass body for several hours at about 800° C.

The OH ions in the quartz glass beads diffuse to the surface and react there with the dry gas to form HCl gas, which is gradually transported out of the quartz glass body. As a result, the OH content in the material can be lowered to values below 0.01 ppm. This low OH content is required to reduce the OH absorption band in the waveguide pulled from the quartz glass to a value significantly below 1 dB/km.

Then the furnace temperature is increased to such a point that the porous glass body melts to form a solid rod.

In the production of substrate rods for MCVD and PCVD preforms and in the production of casing tubes, the porous quartz glass body is produced with a much larger inside diameter and is fused to form a solid tube after drying.

Because the drying process lasts many hours and calls for the use of aggressive drying gases, which must always be fresh and of high purity as they flow through the furnace, it represents a time-consuming and cost-intensive process step. The need to dispose of large amounts of waste gas also leads to considerable cost.

SUMMARY OF THE INVENTION

The goal of the invention is to achieve a significant reduction in the seriousness of the defects described above along with a significant reduction in the production time and cost.

The task of the invention is to develop the processes described, especially the OVD process, to arrive at a modification which drastically reduces the drying time and the consumption of aggressive drying gases.

Exemplary Embodiment:

Details of the invention, how they function, and the advantages to be obtained can be derived from the following exemplary embodiment. The associated drawings include:

DETAILED DESCRIPTION OF THE PREFERRED EMBODIMENT

Figure 1:
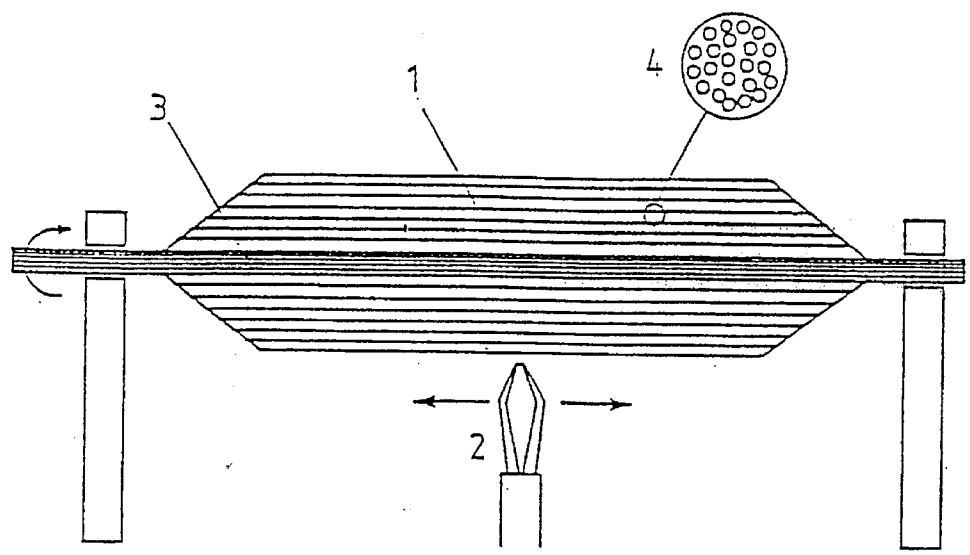
FIG. 1 shows the prior art outside vapor deposition (OVD) process.
Figure 2:
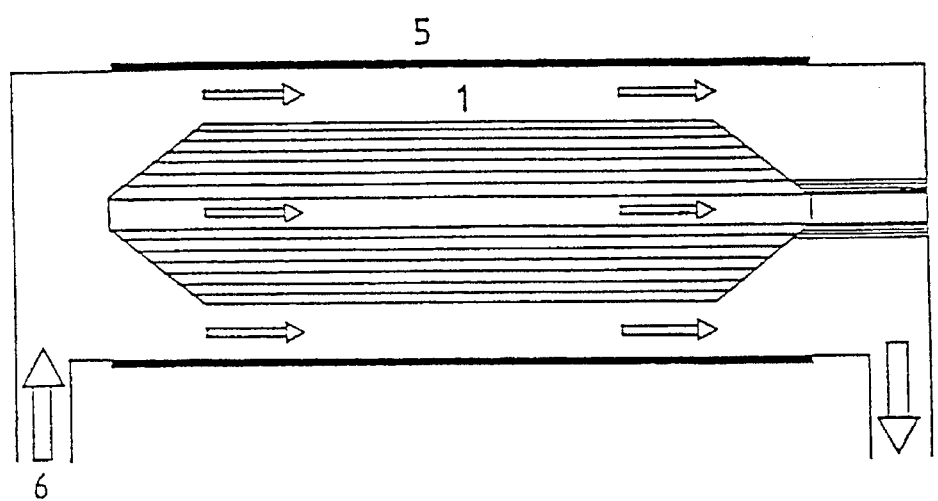
FIG. 2 shows the drying process according to the prior art OVD process.

The description of the OVD process has already been provided on the basis of FIGS. 1 and 2 in the presentation of the state of the art above.

Figure 3:
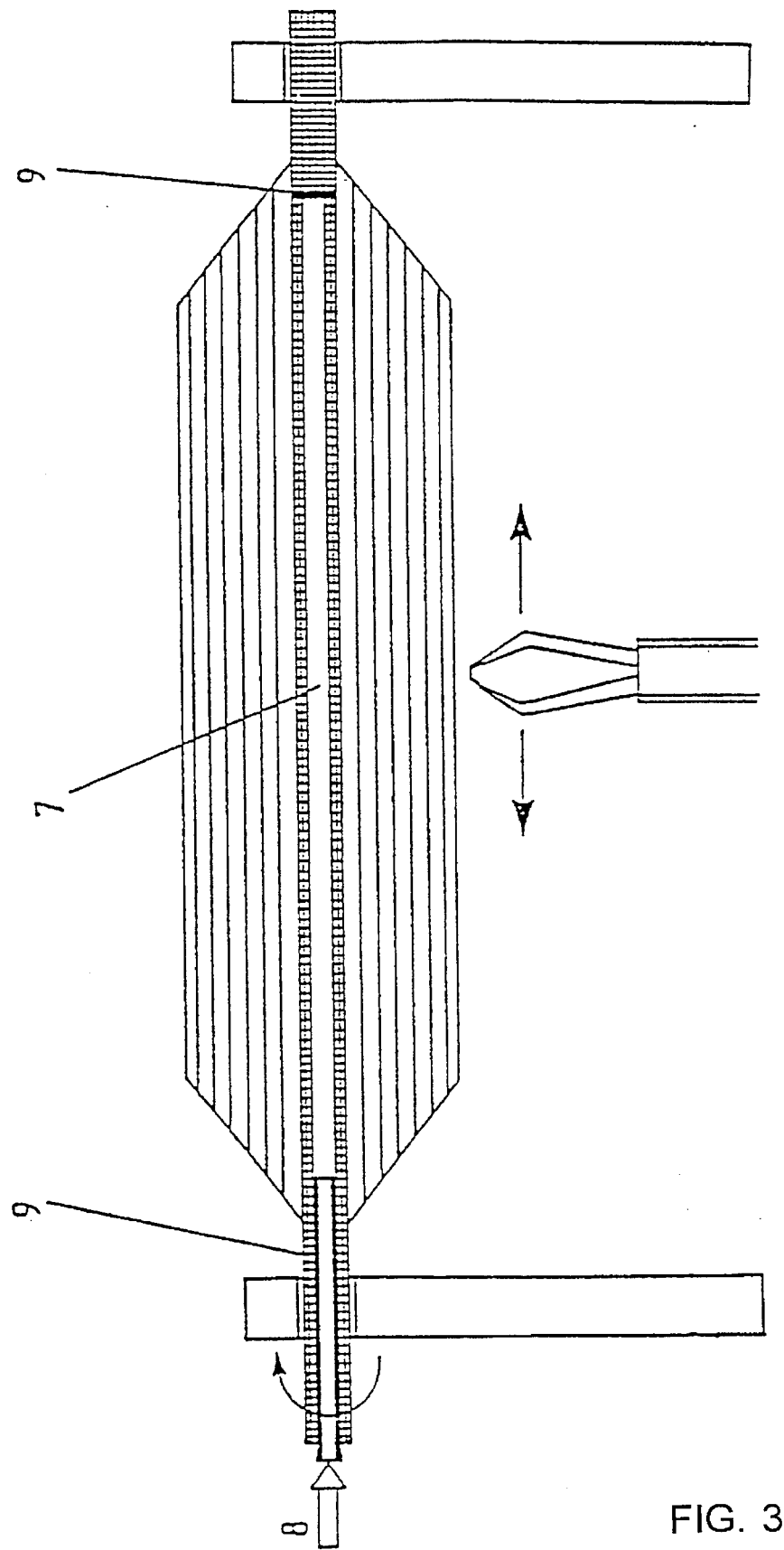
FIG. 3 shows the modified process according to the invention.

The modified process according to the invention is referred to below as the "MOVD" (Modified Outside Vapor Deposition) process. The description of the MOVD process is presented on the basis of the device illustrated schematically in FIG. 3.

The substrate rod normally used in the conventional OVD process is replaced by a substrate tube 7 of fine-pored, gas-permeable ceramic, preferably aluminum oxide or zirconium oxide. A gas mixture 8 consisting of a chemically active gas such as chlorine or thionyl chloride and additional gases such as helium, argon, and oxygen are conducted under pressure into the interior of the substrate tube through a gas-tight, rotary leadthrough (not shown).

The interior pressure in the substrate tube, the wall thickness, and the gas permeability of the tube material are selected so that, during the hydrolytic deposition of the porous quartz glass, the water vapor from the burner gases cannot intrude into the interior of the glass body. During the deposition process, which lasts several hours, fresh drying gas mixture flows continuously from the inside to the outside and removes from the quartz glass the OH ions which were built into the structure during condensation.

In contrast to the conventional OVD process, in which a high partial pressure of water vapor is present in the voids between the quartz glass beads during the entire deposition time, in the process according to the invention, drying gas mixture is always flowing through the porous material and leads to the almost complete elimination of the OH ions during the several hours of this high-temperature process.

In contrast to the OVD process, the OH concentration in the MOVD process is the lowest near the axis, that is, precisely in the zone where the core material for the waveguide will be deposited and which has the strongest influence on the absorption of light in the fibers.

In the MOVD process, deposition and drying are carried out simultaneously in the first step. The drying gas is put to use in a much more economical way than in the OVD process. Whereas, in the OVD process, large amounts of gas flow past the porous glass body, in the new process the drying gas is forcibly guided through the material. The small amounts of drying gas which accumulate in the MOVD process and emerge from the surface of the porous quartz glass body can be disposed of together with the larger amount of hydrolysis waste gases.

As already mentioned, in the OVD process a porous quartz glass body with a density of 10% to 25% of solid quartz glass is produced. A low density is necessary to ensure that drying, which takes place by way of a relatively slow gas exchange process, does not take an unacceptably long time. In the MOVD process, however, because of the much more effective drying process, the density of the quartz glass body can be at least twice as high. As a result, two important advantages are obtained: First, the quartz glass body is more stable, and the danger of breakage when it is being removed from the substrate tube and when it is undergoing the following steps of the process is smaller. Second, when the particles are fused together, proportionately larger preforms, i.e., thicker-walled tubes, are obtained.

After all the quartz has been deposited and the burner has been turned off, the drying gas stream is maintained until the glass body has cooled to a temperature of about 50° C. As a result, the outer boundary zone, which may still contain a certain OH concentration, is subjected to further drying, and the intrusion of water vapor from the surrounding air into the porous material is prevented. Finally, the glass body is removed from the ceramic tube and fused together under the action of the conventional drying gas mixture to form a solid rod.

Substrate tubes for MCVD and PCVD preforms and for casing tubes can also be produced of nearly OH-free quartz glass in the same way. Instead of a ceramic tube with relatively small inside and outside diameters, a substrate tube with an appropriately large diameter is used for the production of the tubes, and the porous quartz glass tube is not collapsed to form a rod; instead, only the tube walls are fused together to form dense quartz glass.

Because the drying gases in the MOVD process are intended to emerge only in the area where the quartz glass is being deposited, it is helpful and also necessary for the protection of the bearings in the mounts to provide the substrate tube in the other areas with gas-tight inserts 9 or sintered zones.

In conclusion, the most important advantages of the process according to the invention can be summarized once again:

In the MOVD process, the deposition of the glass and the drying step are carried out simultaneously. As a result, several hours of production time are saved, and the amounts of aggressive drying gases required are considerably reduced. Associated with this is a considerable reduction in the cost of waste gas disposal.

Because of the effectiveness of the drying process, the density of the porous glass body can be increased, and thus the danger of breakage during further processing is reduced. The weight of the preforms and tubes which can be produced can also be increased.

Existing OVD systems can be modified at low cost for operation according to the new MOVD process.

I claim:

1. Process of manufacturing a quartz glass preform, said process comprising providing a tubular substrate made of a porous oxide ceramic, providing a hydrolysis gas mixture containing silicon tetrachloride and oxygen, building up a deposit of glass soot consisting of partially fused quartz glass on said tubular substrate by moving said substrate relative to a flame while exposing said substrate to said flame and said hydrolysis gas mixture, purging said deposit by providing a drying gas mixture under positive pressure inside said tubular substrate while said deposit is being built-up on said substrate and, removing said deposit of glass soot from said substrate as a quartz glass preform.

2. Process as in claim 1 wherein said deposit is built up so that said partially fused quartz glass has a density of more than 25% of the density of solid quartz glass.

3. Process as in claim 1 wherein said drying gas mixture comprises at least one of the group consisting of chlorine and thionyl chloride, and at least one of the group consisting of helium, argon, and oxygen.

4. Process as in claim 1 wherein said porous oxide ceramic consists of one of aluminum oxide and zirconium oxide.

5. Process as in claim 1 wherein said tubular substrate has an inside diameter of 0.5 to 20 cm.

6. Process as in claim 1 wherein said moving of said substrate relative to said flame comprises rotation about an axis which is coaxial to said tubular substrate while said deposit is built-up.

7. Process as in claim 6 wherein said tubular substrate is provided with gas tight fittings outside of where said deposit is built-up.

\* \* \* \* \*